United States Patent
Kauhanen et al.

(10) Patent No.: US 6,799,042 B1
(45) Date of Patent: Sep. 28, 2004

(54) TRAFFIC BEARER ALLOCATION PROCEDURE

(75) Inventors: Timo Kauhanen, Kirkkonummi (FI); Outi Koivupuro, Hyvinkää (FI); Pekka Ruuska, Oulu (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/719,368

(22) PCT Filed: Jun. 28, 1999

(86) PCT No.: PCT/FI99/00571

§ 371 (c)(1),
(2), (4) Date: Mar. 12, 2001

(87) PCT Pub. No.: WO99/67957

PCT Pub. Date: Dec. 29, 1999

(30) Foreign Application Priority Data

Jun. 25, 1998 (FI) ................................................. 981474

(51) Int. Cl.⁷ ................................................ H04Q 7/20
(52) U.S. Cl. .................. 455/450; 455/432.1; 455/434; 455/451; 455/452.2; 455/509; 370/329
(58) Field of Search .......................... 455/414.1, 422.1, 455/424, 432.1–432.3, 434, 450, 451, 452.1–452.2, 455, 509; 370/328–29, 337; 379/201.01, 207.07, 231, 234

(56) References Cited

U.S. PATENT DOCUMENTS 4,612,637 A * 9/1986 Davis et al. ................. 370/348
5,280,630 A * 1/1994 Wang ........................ 455/452.2
5,465,390 A * 11/1995 Cohen .......................... 455/446
5,745,853 A * 4/1998 Hippelainen ................ 455/450
5,754,955 A * 5/1998 Ekbatani ................... 455/422.1
5,940,763 A * 8/1999 Alperovich et al. ........ 455/450
5,995,825 A * 11/1999 Hietalahti ................ 455/414.4
6,088,587 A * 7/2000 Abbadessa .................. 455/424

FOREIGN PATENT DOCUMENTS

| FI | WO98-36600 | * 8/1998 | ............ H04Q/7/36 |
| WO | WO 98/00998 | 4/1997 | |
| WO | WO 97/12490 | 6/1997 | |

* cited by examiner

Primary Examiner—William Trost
Assistant Examiner—Stephen D'Agosta
(74) Attorney, Agent, or Firm—Cohen, Pontani, Lieberman & Pavane

(57) ABSTRACT

Optimization of the usage of radio resources in mobile telecommunication systems, particularly during the call set up stage, is accomplished by using a bearer allocation method, which allows late allocation of resources without increasing the risk of not obtaining the desired resources. This is realized using a two-phase bearer allocation mechanism, in which the bearer is only reserved early in the call set up process, and allocated later, when the called party answers or the transmission can otherwise be observed to begin.

8 Claims, 1 Drawing Sheet

US 6,799,042 B1

TRAFFIC BEARER ALLOCATION PROCEDURE

PRIORITY CLAIM

This is a U.S. national stage of application No. PCT/FI99/00571, filed on Jun. 28, 1999. Priority is claimed on that application and on the following application:

Country: Finland, Application No.: 981474, Filed: Jun. 25, 1998.

TECHNICAL FIELD OF THE INVENTION

The invention is directed to optimization of the usage of radio resources in mobile telecommunication systems, particularly during the call set up stage.

BACKGROUND OF THE INVENTION

The capacity of the air interface is a critical property in any mobile telecommunication system. Therefore, it is desirable that the air interface resources are reserved only when they are needed for transporting user traffic. In the GSM system, this desire gives rise to various call set up strategies, which try to find a compromise between minimizing the use of air interface resources and user convenience. Similar considerations affect also other mobile telecommunications systems such as the UMTS system (Universal Mobile Telephone System), but for simplicity, the following examples of prior art methods focus on the GSM system.

One strategy is the so called very early assignment strategy, in which a full TCH/F channel is allocated at once, when a mobile station requests for a connection. This has the advantage, that call set up time will be rather short, since signaling needed to complete the call set up can be performed using the full capacity of a TCH/F channel.

A second strategy is the so called early assignment strategy, in which a TCH/8 channel is allocated at once, when a mobile station requests for a connection, and a full TCH/F channel is allocated later, when during the signaling the network finds out, that a full TCH/F channel will be required. This strategy saves resources during the call set up, since a TCH/8 channel uses less resources than a TCH/F channel. The drawback is the lengthening of call set up time, since the set up signaling takes a longer time using a TCH/8 channel than using a TCH/F channel.

In a third strategy, named the Off Air Call Set Up (OACSU) procedure, a full TCH/F channel is allocated very late during the call set up, i.e. when the other end answers the call. In this strategy, very little resources are used before the transmission actually commences, e.g. when the subscriber answers. The OACSU procedure is the most resource saving of these three strategies. Nevertheless, it is not widely used due to several drawbacks of the strategy. For example, if allocation of a channel does not succeed immediately when the other end answers the call, the situation is very disturbing for the answering party, who answered a call only to hear complete silence or an automated message until the channel allocation succeeds. Secondly, during call set up inband announcements of various kinds of information are used to assist in the interfacing of different systems to the GSM system. The OACSU procedure and other call set up procedures used in the GSM system are described in further detail for example in the book "The GSM System for Mobile Communications" by Michel Mouly and Marie-Bernadette Pautet, ISBN 2-9507190-0-7, Palaiseau 1992.

In cellular telecommunication systems a single speech connection or data connection through the cellular telecommunication network is called a bearer. Generally, a bearer is associated with a set of parameters pertaining to data communication between a certain terminal equipment and a network element, such as a base station or an interworking unit (TWU) connecting the cellular network to another telecommunications network. The set of parameters associated with a bearer comprises typically for example data transmission speed, allowed delays, allowed bit error rate (BER), and the minimum and maximum values for these parameters. One mobile communication means (ME, Mobile Equipment or MS, Mobile Station) may in some cellular telecommunication systems support one bearer only, in some other systems also more than one simultaneous bearers. This specification uses the term bearer in the following instead of the term channel, since the term bearer better reflects the manifold properties of a connection.

SUMMARY OF THE INVENTION

An object of the invention is to provide a bearer allocation method, which allows late allocation of resources without increasing the risk of not obtaining the desired radio resources.

The objects are reached by using a two-phase bearer allocation mechanism, in which the bearer is only reserved early in the call set up process, and allocated later, when the called party answers or the transmission can otherwise be observed to begin.

The method according to the invention is characterized by that, which is specified in the characterizing part of the independent method claim. The dependent claims describe further advantageous embodiments of the invention.

BRIEF DESCRIPTION OF THE DRAWINGS

The invention is described in more detail in the following with reference to the accompanying drawing 1, which illustrates an advantageous embodiment of the invention.

DETAILED DESCRIPTION

Figure 1:
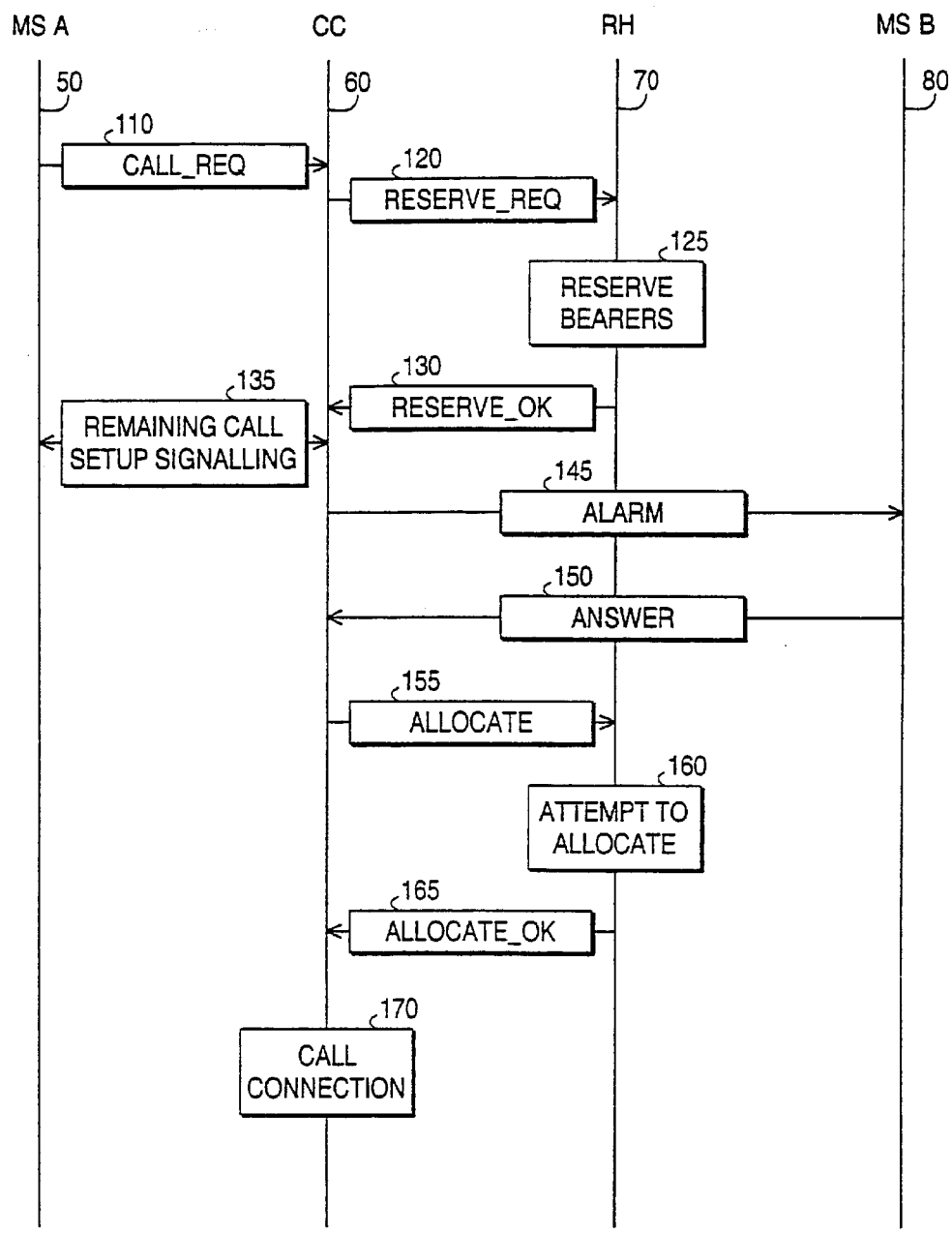

An example of signaling according to an advantageous embodiment of the invention is shown in FIG. 1. FIG. 1 illustrates some of the signaling associated between call set up between two mobile stations MS A 50 and MS B 80. FIG. 1 further shows a call control entity CC 60 and a radio resource handling entity RH 70. The radio resource handling entity RH is typically implemented in a BSC (base station controller) in the GSM system, or in a RNC. (radio network controller) in the UMTS system. The call control entity CC is typically implemented in a MSC (mobile services switching centre).

When the user of MS A calls the user of MS B, mobile station MS A sends 110 a request for a call CALL_REQ to the call control entity CC. The call control entity CC sends 120 a bearer reservation request RESERVE_REQ to the resource handling entity RH. The resource handling entity RH checks the currently available radio resources and determines a probability estimate on how probable it is, that the requested resources are available later, when the call is connected. The probability estimate is preferably based at least partly on the current availability of radio resources. If the probability estimate exceeds a predetermined limit, the resource handling entity RH reserves bearers 125 according to the request for a call. In other words, if the statistical probability of enough resources becoming available is high enough, the resources are reserved. After reservation of resources, the resource handling entity RH sends 130 an acknowledgment message RESERVE_OK back to the call control entity CC. After receiving the acknowledgment, the call control entity CC performs 135 any other remaining call setup signaling with the calling mobile station. Subsequently, the call control entity CC alerts the answering mobile station MS B 80 and initiates call setup signaling with MS B, which is represented by an ALARM message 145 in FIG. 1. For clarity, details of call set up signaling with MS B are not shown any further in FIG. 1. When the mobile MS B answers, which is represented by an ANSWER message 150 from MS B to CC, the call control entity CC sends 155 an ALLOCATE command to the resource handling entity RH. The resource handling entity then attempts to allocate 160 the reserved bearers. In the example of FIG. 1, this allocation is successful, whereby the resource handling entity sends 165 an ALLOCATE_OK acknowledgment message back to the call control entity CC. After receiving the acknowledgment message, the call control entity CC continues in the normal way to connect the call using the allocated resources, which is represented by the CALL CONNECTION rectangle 170 in FIG. 1.

In the following, some details mentioned in the previous description of FIG. 1 are described further.

It may not be feasible or even possible to guarantee that the following allocation of a reserved bearer succeeds. The determination of the probability of enough resources becoming available is advantageously based on the current situation which at some probability will remain unchanged until the bearer allocation is done. The latter probability is dependent on many factors, for example on parameters used in the resource handling/admission control entity. Values for the latter probability in different traffic conditions may be found for example by compiling statistics of actual resource behavior.

The previously described predetermined limit for deciding whether or not to reserve bearers is preferably set in such a way, that it can be statistically assumed that enough resources will become available before the commencement of the actual data traffic, although the resources might not be sufficient at the time of the reservation. Preferably, the current load on the network and the amount of previous reservations is taken into account in determination of the probability of resources becoming available.

The properties of the allocated bearer are not necessarily identical to those of the reserved bearer, since the bearer allocation stage can comprise bearer parameter negotiation. The realized end-to-end bearer can have negotiated bearer parameters, which are different from the originally requested properties. The reservation may also be done with different properties than originally requested.

The bearer allocation can be triggered by the answering of the called end. However, the invention is not limited to that, since other triggering events can also be used in a method according to the invention. For example, other call setup protocol events such as alerting indication can be used as triggering events.

FIG. 1 illustrates signaling in a case, when there are enough resources available. Some other possible situations are discussed in the following.

In case the probability of resources becoming available does not exceed said predetermined limit, the call control function may return a message to the calling mobile station, indicating that the network is busy.

In another embodiment of the invention, the call control function may attempt to immediately allocate resources from the resource handling entity if the probability of resources becoming available is too low, and only return a network busy message to the calling mobile station, if the immediate allocation does not succeed.

Preferably, the resource handling function does not allow double reservation of resources, i.e. reservation of already reserved resources. Preferably, the reservations have a predetermined timeout period, after which the reservations are released by the resource handling function. The call control function may also send a command to the resource handling function to release certain reservations, for example if the called party does not answer or a call is cancelled for some other reason during call set up phase.

The operator of the network may advantageously choose whether reservations have precedence over immediate allocation requests. For example, if at some location all the remaining resources are reserved, waiting upon call completion of one or more calls, and a further mobile station makes an immediate resource allocation request, the network has to choose between allowing the immediate request, thereby causing a problem with at least one of the reserved pending calls, and refusing the immediate resources.

Typically, the delay of allocating the bearer is short, since the mechanism of reservation of bearers increases considerably the probability of successful allocation as compared to the situation according to the prior art such as the OACSU procedure. Therefore, the inventive method does not disturb the answering party, while providing the resource savings associated with very late allocation of procedures.

Although FIG. 1 describes signaling associated with a mobile originating call, the invention is not in any way limited only to mobile originating calls. The inventive method can be applied also in the case of mobile terminating calls, or at both ends of a mobile-to-mobile call. In the case of a mobile terminating call, the network may reserve the necessary air interface resources, when call setup signaling is initiated with the answering mobile station. When the user of the mobile station answers the call, the network allocates the resources needed for the call.

Although the invention has been described with reference to GSM and UMTS systems, the present invention is not limited in any way to be used in only these two systems. The present invention may be used also in other mobile cellular systems.

The name of a given functional entity, such as the radio network controller (RND.) of the UMTS system, is often different in the context of different cellular telecommunication systems. For example, in the GSM system the functional entity corresponding to a radio network (RND.) is the base station controller (BSC).

Further, the various command names such as the RESERVE_REQ or the ALARM command name are intended to be generic examples only, and the invention is not limited to using the command names recited in this specification.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for allocating bearers in a mobile telecommunications system, wherein said method comprises the steps of, attempting, during the set up of a connection over the air interface from a caller to called party, reservation of a bearer as a reserved bearer for later allocation of the connection, the reservation being for a predetermined timeout period, attempting, if said reservation is successful, allocation of the reserved bearer after a predetermined event; and releasing the reservation of the reserved bearer after the timeout period if the reserved bearer is not allocated within the timeout period.

2. A method according to claim 1, wherein said predetermined event is the answering by the called party.

3. A method according to claim 1, wherein said step of reserving a bearer comprises determining the probability of the existence of enough free radio resources for the later allocation of the reserved bearer.

4. A method according to claim 3, wherein said step of reserving a bearer comprises checking that the probability exceeds a certain predetermined limit.

5. A method according to claim 3, wherein said step of determining the probability accounts for the amount of currently free radio resources and the amount of reservations.

6. A method according to claim 3, wherein the probability is based at least partially on compiled statistics of actual resource behavior.

7. A method for allocating bearers in a mobile telecommunications system, wherein said method comprises the steps of, attempting, during the set up of a connection over the air interface from a caller to called party, reservation of a bearer as a reserved bearer for later allocation of the connection, by determining the probability of the existence of enough free radio resources for the later allocation of the reserved bearer and checking that the probability exceeds a certain predetermined limit, attempting, if said reservation is successful allocation of the reserved bearer after a predetermined event; and attempting to immediately allocate resources if the probability does not exceed the predetermined limit.

8. A method for allocating bearers in a mobile telecommunications system, wherein said method comprises the steps of, attempting, during the set up of a connection over the air interface from a caller to called party, reservation of a bearer as a reserved bearer for later allocation of the connection, by determining the probability of the existence of enough free radio resources for the later allocation of the reserved bearer and checking that the probability exceeds a certain predetermined limit, attempting, if said reservation is successful, allocation of the reserved bearer after a predetermined event, wherein the reserved bearer has a precedence over immediate allocation requests.

* * * * *